Aug. 24, 1948.  H. S. KIRSHBAUM  2,447,655
REGULATING SYSTEM
Filed Aug. 30, 1946

WITNESSES:  
E.A. Wilbotty  
Nw. C. Groome

INVENTOR  
Herbert S. Kirschbaum  
BY  
James N. Ely  
ATTORNEY

Patented Aug. 24, 1948

2,447,655

UNITED STATES PATENT OFFICE 2,447,655

REGULATING SYSTEM

Herbert S. Kirschbaum, Pittsburgh, Pa., assignor to Westinghouse Electric Corporation, East Pittsburgh, Pa., a corporation of Pennsylvania Application August 30, 1946, Serial No. 694,066

4 Claims. (Cl. 322—28)

This invention relates to regulating systems.

An object of this invention is to provide a regulating system having a simplified measuring circuit for controlling the regulating action.

Another object of this invention is to provide in a regulating system, a measuring circuit substantially free from temperature errors.

A further object of this invention is to provide a regulating system embodying a measuring circuit in which temperature errors are minimized.

Figure 1:
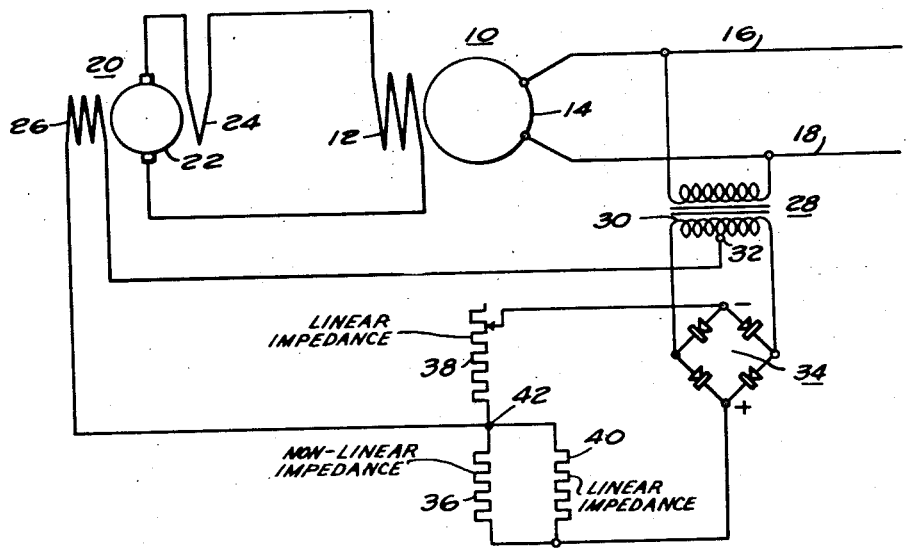
Figure 2:
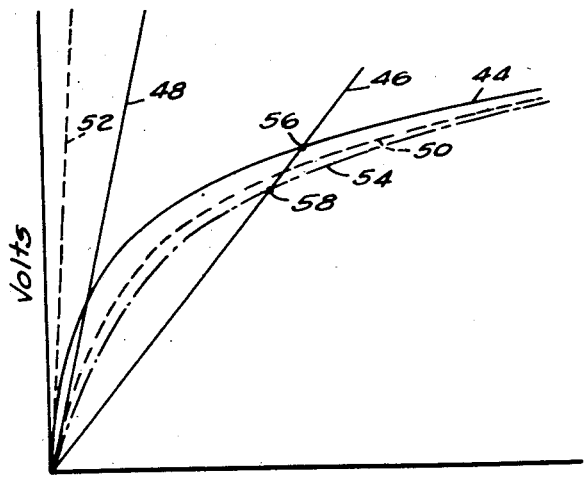

Other objects of this invention will become apparent from the following description, when taken in conjunction with the accompanying drawing in which:

Figure 1 is a diagrammatic representation of a regulating system embodying the teachings of this invention; and Fig. 2 is a graph, the curves of which illustrate the volt-ampere characteristics of certain elements of the system of Fig. 1 at different temperatures.

Referring to Figure 1, this invention is illustrated by reference to an alternating-current generator 10 having field windings 12 and armature windings 14 connected to supply load conductors 16 and 18. The field windings 12 are connected to be energized by a self-excited exciter 20, the exciter 20 and generator 10 being disposed to be driven by some suitable prime mover (not shown).

The exciter 20 illustrated comprises armature windings 22, a series field winding 24 and a control field winding 26. The armature windings 22 are connected through the series field windings 24 to the field windings 12 of the generator 10. In practice, the exciter 20 is so designed that the series field winding 24 is sufficient for supplying the normal excitation of the exciter, the control field winding 26 being disposed to be directionally energized to maintain the excitation required to supply the generator 10.

In this embodiment, the control field winding 26 is disposed to be energized in accordance with variations of the line voltage from a predetermined value which is to be regulated. As illustrated, a potential transformer 28 is connected across load conductors 16 and 18 and is provided with secondary windings 30 which are energized in accordance with the line voltage. In this instance, the secondary windings 30 are provided with a mid-tap 32 so positioned that its potential is intermediate the potential of the terminals of the secondary winding, the purpose of which will be explained hereinafter.

The terminals of the secondary windings 30 are connected to the input terminals of a full-wave rectifying unit 34, the output terminals of which are connected to supply uni-directional current to a non-linear impedance element 36 and an adjustable linear impedance element 38 which are connected in series circuit relation. Another linear impedance element 40 is connected in parallel circuit relation with the non-linear element 36 for compensating for temperature variations, as will be explained more fully hereinafter.

One end of the control field winding 26 is connected to the mid-tap 32 of the secondary winding 30 of potential transformer 28 and the other end of the control field winding 26 is connected to an intermediate tap 42 between the series-connected non-linear impedance element 36 and linear impedance element 38 whereby the control field winding 26 is directionally energized in accordance with the potentials at taps 32 and 42.

In practice, the non-linear impedance element 36 is formed of a suitable material having a negative temperature coefficient, such a Thyrite, or of suitable Rectox discs, and which has a volt-ampere characteristic as illustrated by curve 44 of Fig. 2. The linear impedance element 38 has a straight line volt-ampere characteristic, as illustrated by curve 46 of Fig. 2. The temperature compensating linear impedance element 40 is preferably of nickel and has a volt-ampere characteristic curve as represented by curve 48 of Fig. 2.

The curves 44 and 48 are representative of the volt-ampere characteristics of elements 36 and 40, respectively, under normal room temperature conditions. As the elements become heated, the curves 44 and 48 vary and assume the shape of dotted curves 50 and 52 respectively, and as the elements 36 and 40 are connected in parallel circuit relation, they cooperate to give a substantially constant volt-ampere characteristic curve, as represented by curve 54 of Fig. 2, under all temperature conditions. Thus, while the series-connected elements 36 and 38 have intersecting impedance characteristics, as represented by the intersecting point 56, such point will vary along the curve 46 as the temperature of element 36 varies. However, where the elements 36 and 40 are connected in parallel circuit relation, as illustrated, the combined volt-ampere characteristic curve 54 is substantially constant and the intersecting impedance characteristics of the linear impedance element 38 and the temperature compensated non-linear impedance element 36 is represented by the intersecting point 58.

Thus, as the line voltage varies from the predetermined value which is to be regulated, and for which the series-connected elements are adjusted to have the intersecting impedance characteristic represented by point 58, an unbalance in the current drawn by the respective elements 36 and 38 results and the potential of the intermediate tap 42 varies accordingly. For example, if the line voltage should rise above the predetermined value, the non-linear impedance element 36 draws more current than the linear impedance element 38. Assuming that the circuits have been initially adjusted so that for a given predetermined line voltage, the potential of the midtap 32 is the same as the potential at the intermediate tap 42, then when the element 36 draws more current than the element 38 as the line voltage rises, the potential of tap 42 rises with respect to the potential of the mid-tap 32. Under such conditions, current flows from tap 42 through the control field winding 26 to tap 32 to produce an action to oppose the excitation of the self-energizing winding 24 to decrease the output from the exciter generator 20 and consequently decrease the output of the generator 10 to return the line voltage to the predetermined value.

If the line voltage should decrease from the predetermined value which is to be maintained, then the linear impedance element 38 draws more current than the non-linear impedance element 36 and the potential of mid-tap 32 rises with respect to the potential of tap 42. Thus, current flows in the control field winding 26 in a direction to produce an action that is cumulative to that of the self-energizing winding 24 to increase the excitation of the exciter 20, and consequently to increase the output of the generator 10 to return the line voltage to the predetermined value to be maintained.

While the system is illustrated as employing a temperature compensating element 40 in parallel circuit relation with the non-linear impedance element 36, it is possible to operate the system where element 40 is omitted provided the non-linear element 36 is operated at as high a temperature rise above ambient as possible. Under such conditions of operation, temperature variations are minimized. Best results are obtained, however, where the temperature compensation element 40 is included as as essential element in the system. As will be apparent, the system is satisfactory over wide ranges of control coil current when employed with single-phase circuits, for, as the control coil current flows in each half of the secondary winding 30 on alternate half cycles, the current will not saturate the core of the transformer with direct-current flux.

When applied to a three-phase system, the tap 32 becomes the neutral tap of the Y-connected secondary winding of a three-phase transformer, which supplies a full-wave rectifier in a manner similar to that of the single-phase system illustrated. Whether the system is single-phase or three-phase, the tap 32 of the secondary winding of the transformer has a potential midway between the potential of the rectified voltage as measured across the output terminals of the rectifier. In the case of the three-phase system, the current flow in the control field winding will tend to saturate the core of the transformer with direct-current flux. However, as the control winding energy is only a very small fraction of the total energy consumed by the measuring circuit, the direct-current saturation of the transformer core will be negligible.

I claim as my invention:

1. In a regulating system for an alternating-current generator disposed to supply a load at a predetermined line voltage, in combination, a self-excited exciter disposed to control the field excitation of the generator, a control field winding for the exciter, and means for connecting the control field winding to be responsive to variations in the line voltage, said means comprising a transformer having a secondary winding connected to be energized in accordance with the line voltage, the secondary winding being provided with a mid-tap, a full-wave rectifying unit connected across the secondary winding to be supplied therefrom, the mid-tap of the secondary winding of the transformer having a potential midway between the potential of the rectified voltage, and a non-linear impedance element and a linear impedance element connected in series circuit relation disposed to be supplied from the rectifying unit, the control field winding being connected between the mid-tap of the secondary winding and a tap intermediate the series-connected linear and non-linear impedance elements to be directionally energized depending upon the relation of the potential of the intermediate tap with respect to the potential of the mid-tap.

2. In a regulating system for an alternating-current generator disposed to supply a load at a predetermined line voltage, in combination, a self-excited exciter disposed to control the field excitation of the generator, a control field winding for the exciter, and means for connecting the control field winding to be responsive to variations in the line voltage, said means comprising a transformer having a secondary winding connected to be energized in accordance with the line voltage, the secondary winding being provided with a mid-tap, a full-wave rectifying unit connected across the secondary winding to be supplied therefrom, the mid-tap of the secondary winding of the transformer having a potential midway between the potential of the rectified voltage, a non-linear impedance element and a linear impedance element connected in series circuit relation disposed to be supplied from the rectifying unit, and a linear impedance element connected in parallel circuit relation with the series-connected non-linear impedance element to compensate for temperature changes, the control field winding being connected between the mid-tap of the secondary winding and a tap intermediate the series-connected linear and non-linear impedance elements to be directionally energized depending upon the relation of the potentials of said taps.

3. In a regulating system for an alternating-current generator disposed to supply a load at a predetermined line voltage, in combination, a self-excited exciter disposed to control the field excitation of the generator, a control field winding for the exciter, and means for connecting the control field winding to be responsive to variations in the line voltage, said means comprising a transformer having a secondary winding connected to be energized in accordance with the line voltage, the secondary winding being provided with a tap having a potential midway between the terminals of the winding, a full-wave rectifying unit connected across the secondary winding to be supplied therefrom, a non-linear impedance element and a linear impedance element connected in series circuit relation disposed to be supplied from the rectifying unit, and a tap intermediate the series-connected impedance elements disposed to have a potential variable as the line voltage changes, the control field winding being connected between the midway potential tap and the intermediate tap to be directionally energized depending upon the relation of the potentials of said taps.

4. In a regulating system for an alternating-current generator disposed to supply a load at a predetermined line voltage, in combination, a self-excited exciter disposed to control the field excitation of the generator, a control field winding for the exciter, and means for connecting the control field winding to be responsive to variations in the line voltage, said means comprising a transformer having a secondary winding connected to be energized in accordance with the line voltage, the secondary winding being provided with a tap having a potential midway between the terminals of the winding, a full-wave rectifying unit connected across the secondary winding to be supplied therefrom, a non-linear impedance element and a linear impedance element connected in series circuit relation disposed to be supplied from the rectifying unit, a tap intermediate the series-connected impedance elements disposed to have a potential variable as the line voltage changes, and means connected in circuit relation with the non-linear element for cooperating therewith to compensate for temperature changes to maintain the potential at the intermediate tap substantially independent of temperature changes, the control field winding being connected between the midway potential tap and the intermediate tap to be directionally energized depending upon the relation of the potentials of said taps.

HERBERT S. KIRSCHBAUM.